United States Patent
Falchuk et al.

(10) Patent No.: US 8,255,505 B2
(45) Date of Patent: Aug. 28, 2012

(54) SYSTEM FOR INTELLIGENT CONTEXT-BASED ADJUSTMENTS OF COORDINATION AND COMMUNICATION BETWEEN MULTIPLE MOBILE HOSTS ENGAGING IN SERVICES

(75) Inventors: Benjamin W. Falchuk, Upper Nyack, NY (US); Shoshana K. Loeb, Philadelphia, PA (US)

(73) Assignee: Telcordia Technologies, Inc., Piscataway, NJ (US)

( * ) Notice: Subject to any disclaimer, the term of this patent is extended or adjusted under 35 U.S.C. 154(b) by 906 days.

(21) Appl. No.: 12/182,621

(22) Filed: Jul. 30, 2008

(65) Prior Publication Data

US 2009/0037928 A1 Feb. 5, 2009

Related U.S. Application Data

(60) Provisional application No. 60/962,561, filed on Jul. 30, 2007.

(51) Int. Cl.
*G06F 15/173* (2006.01)
(52) U.S. Cl. ........ 709/223; 709/203; 709/226; 709/212; 370/229
(58) Field of Classification Search .......... 709/212, 709/223, 226, 203; 455/68; 701/300; 718/108, 718/101; 370/229, 230.1
See application file for complete search history.

(56) References Cited

U.S. PATENT DOCUMENTS

| | | | | |
|---|---|---|---|---|
| 6,742,037 | B1 * | 5/2004 | Hall et al. | 709/228 |
| 6,985,933 | B1 * | 1/2006 | Singhal et al. | 709/219 |
| 7,206,805 | B1 * | 4/2007 | McLaughlin, Jr. | 709/203 |
| 2002/0161862 | A1 | 10/2002 | Horvitz | |
| 2005/0273668 | A1 * | 12/2005 | Manning | 714/39 |
| 2006/0168101 | A1 * | 7/2006 | Mikhailov et al. | 709/217 |
| 2007/0018851 | A1 | 1/2007 | Ocondi | |
| 2008/0189360 | A1 * | 8/2008 | Kiley et al. | 709/203 |

OTHER PUBLICATIONS

International Search Report, dated Oct. 22, 2008.

* cited by examiner

*Primary Examiner* — Frantz Jean
(74) *Attorney, Agent, or Firm* — Philip J. Feig

(57) ABSTRACT

A system and method for intelligent, context-sensitive enhancement of transactions among a plurality of mobile hosts, each having a local coordinator, engaging in services comprising an actual coordinator and an intelligence coordinator that determines context regarding the mobile hosts, and leverages the context to enhance the transactions between the local coordinators and the actual coordinator. The context can be leveraged by reducing the number and/or the amount of data of the transactions. The context can comprise a physical location, temporal data, and a network load near and at a network location of the mobile host. The system can also have an application operating on the services, in which the intelligence coordinator can improve performance of the application. The intelligence coordinator can receive and parse a meta-expression piggy-backed on a transaction message to enhance transactions.

15 Claims, 8 Drawing Sheets

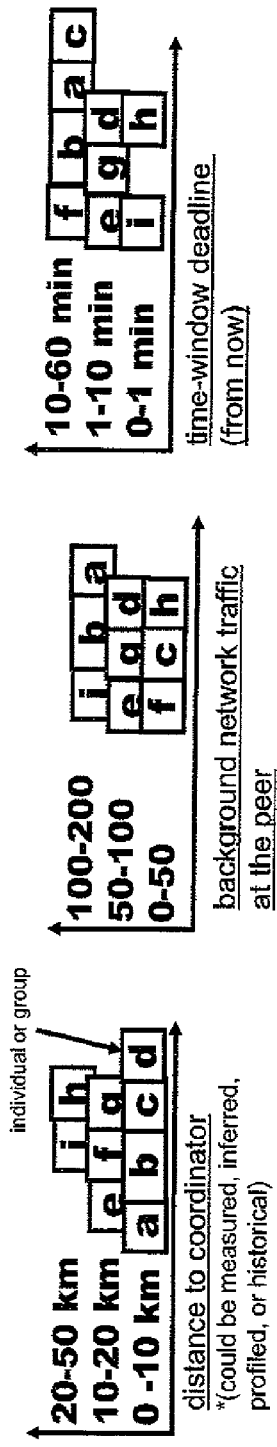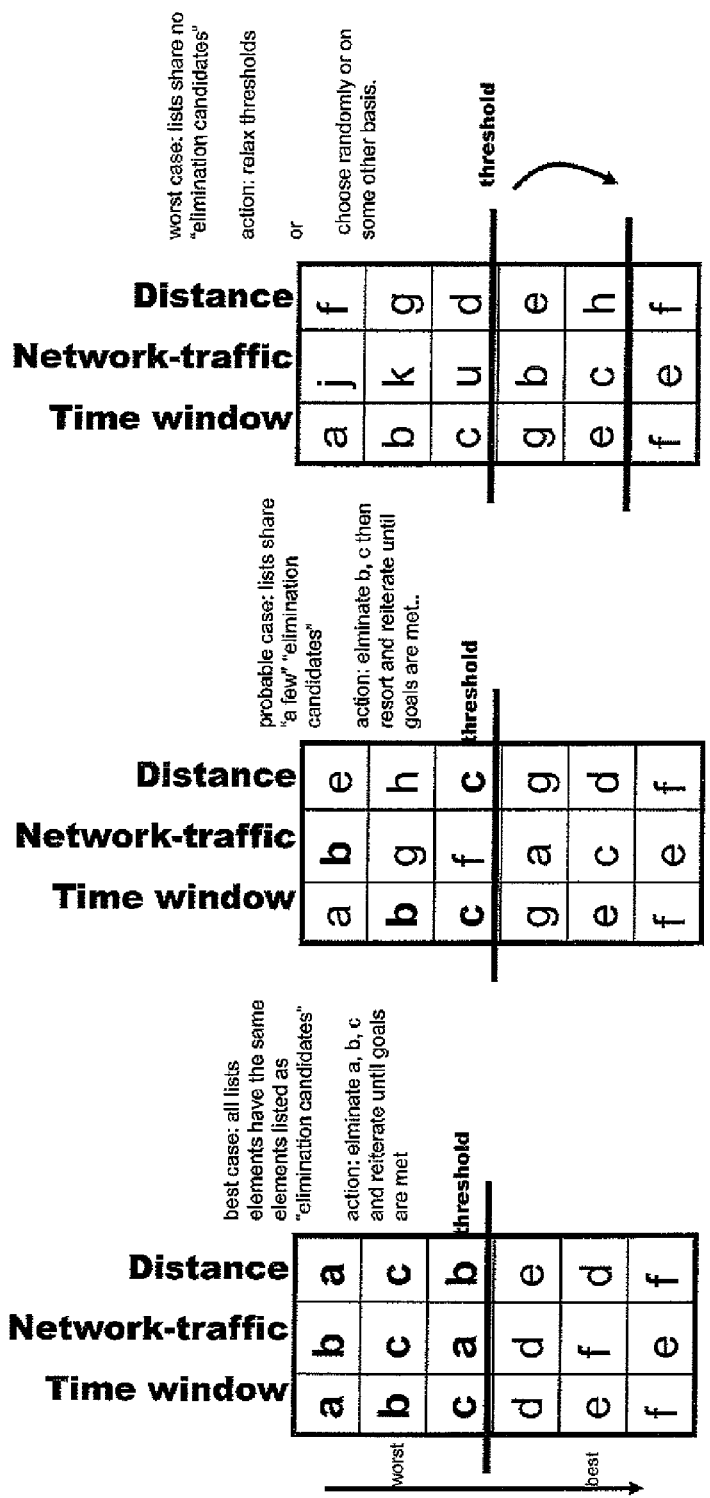
FIGURE 8

SYSTEM FOR INTELLIGENT CONTEXT-BASED ADJUSTMENTS OF COORDINATION AND COMMUNICATION BETWEEN MULTIPLE MOBILE HOSTS ENGAGING IN SERVICES

CROSS REFERENCE TO RELATED APPLICATION

The present invention claims the benefit of U.S. provisional patent application 60/962,561 filed Jul. 30, 2007, the entire contents and disclosure of which is incorporated herein by reference.

FIELD OF THE INVENTION

The present invention relates generally to wireless communications.

BACKGROUND OF THE INVENTION

Recent advances in wireless communications infrastructure and hand-held devices (from smart phones to full-featured PDAs) have changed the mobile computing landscape. In today's mobile application environment, mobile applications residing on a mobile handset (MH) are a common theme. Some of these applications maintain "local state" updated either with no external interactions or by applications running on other mobile devices or back-end servers. For example, mobile workforce applications (ERP, CRM) are quite common and these applications can update local state in a variety of ways.

For example, an application responsible for mobile workforce management can update schedule information stored on MHs. In many cases, schedule updates across several mobile workers need to be coordinated in the context of a transaction. However, depending on coverage and device status, some of the updates may fail. In this case, the application could choose to only update the mobile devices that can be updated with high probability and then attempt to update the rest at some later time.

The above example application cannot be handled correctly using existing state of the art methods, because these methods do not take into account device reachability or accessibility, and device state. As a result, devices are updated in sequence, regardless of either current conditions or conditions when the "commit" was decided upon; the result is increased overhead. A general example is the case where changes to data must be committed across several mobile hosts, that is, at the command of a coordinator, each host is expected to lock resources temporarily, commit changes, and report when finished. In a mobile scenario where all parties (even coordinators) are mobile hosts, it may be more economical to first understand the situation of each mobile host before involving it in a "commit" procedure, as doing so could save resources. Put another way, in the existing state of the art, the remote application's ability to lock and/or commit resources is the only condition taken into account—its state in the physical world (e.g. distance to the coordinator) and relationship with system resources (e.g., network utilization) is ignored.

The distributed mobile services of today, as well as emerging ones, involve a large number of mobile users, each with a MH. We note that each MH has rich computing and storage capabilities, i.e., effectively capable computers, as well as communication capabilities on one or more network types, e.g. cellular, 802.11 (aka "Wi-Fi"), WiMAX, etc. MH's are always present in one particular area or "region of interest" which can be described in different ways, e.g., in terms of the cellular sector and/or cell (when present), Base Tranceiver Station (BTS) attached to the network (cellular, WiMAX, etc.), Wi-Fi Access Point, political borders (e.g., Nassau County, Village of Piscataway, etc.), GPS coordinates of the region, and/or street address.

Any of the above represents just one aspect of the MH's context. Each MH can be considered a resource of media and/or information, and the MH may have a Resource Manager (RM) process that mitigates access to the media and/or other data. For example, the MH may be capable of controlling read/write access to MH data. An MH without a RM can still participate in information exchange but in a more ad hoc, informal fashion (concurrent reads and writes on the MH's data may cause data integrity problems).

With respect to resource management, MH's can participate in services in one of several ways. For example, participation can be with an RM carefully controlling create-read-update-delete (CRUD) access, or without an RM, allowing only Read access. In addition, participation without an RM, allowing full, trusted CRUD access is possible. In this case, neither the MH nor the service is concerned with ensuring traditional atomicity, consistency, isolation and durability (ACID) properties of access or transactions.

Stored media on the MH could include one or more of the following media types and metadata, i.e., songs and playlists, Internet favorites, photographs, videos, GPS information, application logs, and/or other mixable information. An MH could also be providing middleware or "infrastructure" type services (possibly mobile) to peers, offering functions like billing, auditing, validation and/or authentication, and recommendation.

Access-style could very likely include peer-to-peer (finding peer through flooding, registries, etc.), and service-oriented (via standard W3C protocols such as UDDI, SOAP, WSDL). Either asynchronous or syncrhonous style access-style could be permitted.

Regardless of the services and types of data (datatypes) stored and shared on the MH's, any type of coordination and/or communication between devices to render that service will often require several steps. Principle examples of these coordinations and communications are committing transactions where resources are stored on multiple distributed entities, forwarding information and files to multiple parties, establishing VoIP or cellular voice calls, such as two-party or multi-party, and sending reminders or other event types to one or a group of endpoints.

A principle concern in this area is the overhead and costs of using the transmission channel to send the sometimes very numerous messages during these coordinations. For example, while the two-phase-commit (2PC) protocol helps ensure the ACID properties of transactions, it also entails roughly 4n messages, where n is the number of distributed RM's in the transaction. FIG. 1, discussed in more detail below, shows the messaging overhead created when using prior art techniques.

Similarly, call-setup and information forwarding requires large numbers of signaling and network and/or transport-level messaging. These resources are valuable, and the owners of these resources have great interest in keeping them loaded well below peak rates. In addition, false-starts and unsuccessful communications, e.g. to terminating ends that no longer want to accept the communication, are extremely wasteful and inefficient.

Note that, in most current services involving such coordinations and communications, local context is not exploited. Context is the set of circumstances and situations surrounding any event or entity. For a cellular MH, types of context could include current region of interest containing the MH, described above, current speed and direction of the MH, current state of the MH hardware, current weather in MH's region, and/or current cellular background traffic on the attached BTS.

In many cases, exploiting context requires some extra storage and computational steps, but can add significant value to the receiving party or help the intermediate party derive better, more targeted, efficient services. This is especially true for communications and coordinations where correct context information may reduce network or computational resources by intelligently modifying communications or coordination sequences.

What is needed is a system and method providing intelligent context-based adjustment of coordination and communication between multiple mobile hosts engaging in services in which application-level information can occasionally be missed or somewhat inconsistent but the service is still of value to the recipient.

SUMMARY OF THE INVENTION

The inventive solution is a system and method to exploit context in communications and coordinations with a goal that efficiency or quality of experience is increased. An intelligent coordinator (IC) is a functional part of the solution. It is deployed at or near the coordinator or initiator of a communication and/or coordination. The IC is an add-on functional component, that is, its removal does not destroy system functionality. Various functions and activities are performed by the IC, such as intercepting and reading the coordinator/initiator intent, understanding the protocol about to be used, e.g., 2PC, mimicking the coordinator/initiator role from the point of view of peers in this communication, manipulating and passing information back to the actual coordinator, interworking with internal knowledge bases to further understand the communication, interworking with external systems to further build context around the communication, and adding, removing, and/or modifying the number of participants in the communication and/or coordination.

The inventive system and method for intelligent, context-sensitive enhancement of transactions among a plurality of mobile hosts, each having a local coordinator, engaging in services comprises an actual coordinator and an intelligence coordinator that determines context regarding the mobile hosts, and leverages the context to enhance the transactions between the local coordinators and the actual coordinator. The context can be leveraged in order to reduce the number and/or the amount of data of the transactions. The context can comprise a physical location, temporal data, and a network load near and at a network location of the mobile host. The system can also have an application operating on the services, in which case, the intelligence coordinator can improve the performance of the application. The intelligence coordinator can receive and parse a meta-expression piggy-backed on a transaction message, use the parsed meta-expression to form thresholds, and based on the thresholds, the intelligence coordinator can eliminate—or otherwise affect subsequent messaging with—one or more mobile hosts engaging in the services to reduce a number of transactions.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 8 is a ranking approach for one embodiment of the present system.

DETAILED DESCRIPTION OF THE INVENTION

Figure 1:
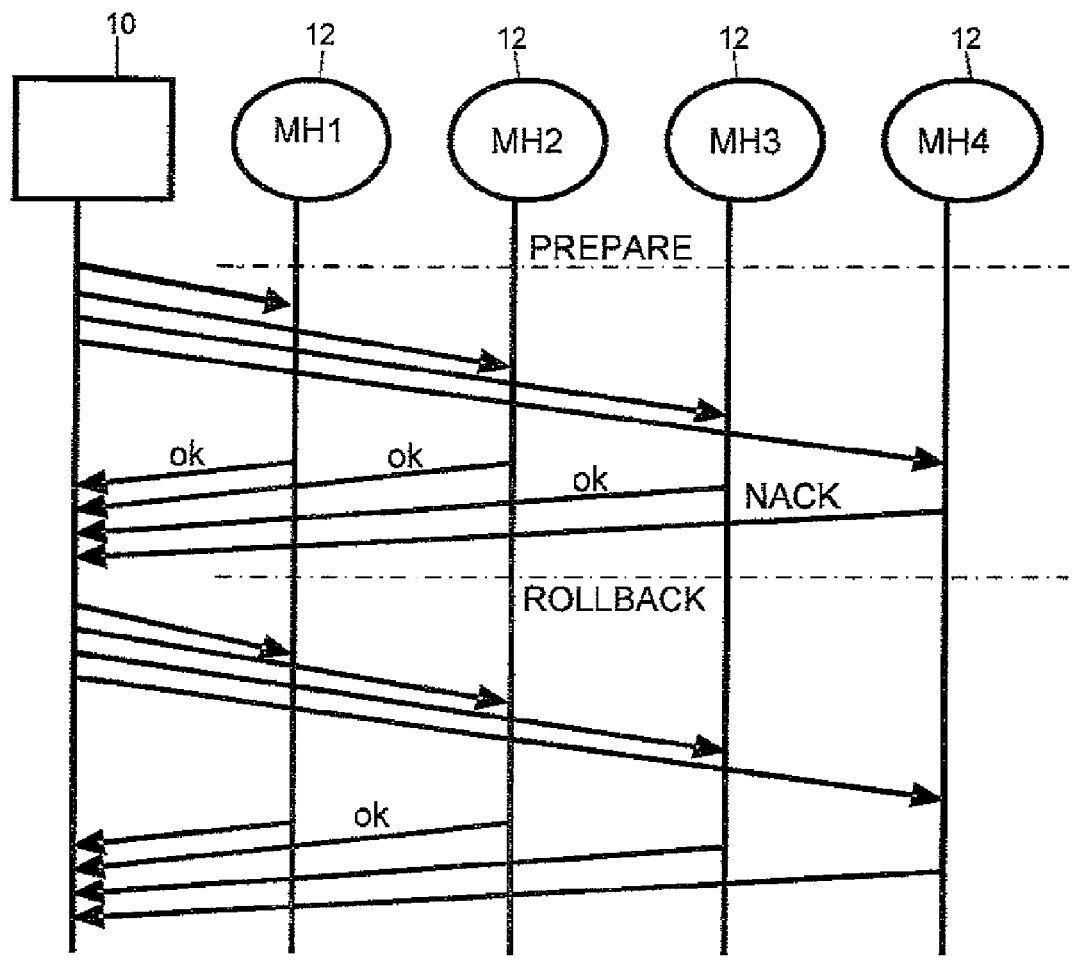
FIG. 1 shows messaging in the prior art.

A system for intelligent context-based adjustments of coordination and communication between multiple mobile hosts engaging in services is presented. FIG. 1 illustrates typical messaging requirements for a coordinator 10 to "commit" a transaction across several mobile hosts 12 (MH1, MH2, MH3, MH4). This involves a series of messages towards the hosts 12 from the coordinator 10 and expected responses. The example in FIG. 1 shows a negative acknowledgement (NACK) by host MH4 12, the NACK causing the commit transaction to be rolled back, necessitating a maximum number of messages be used.

Figure 2:
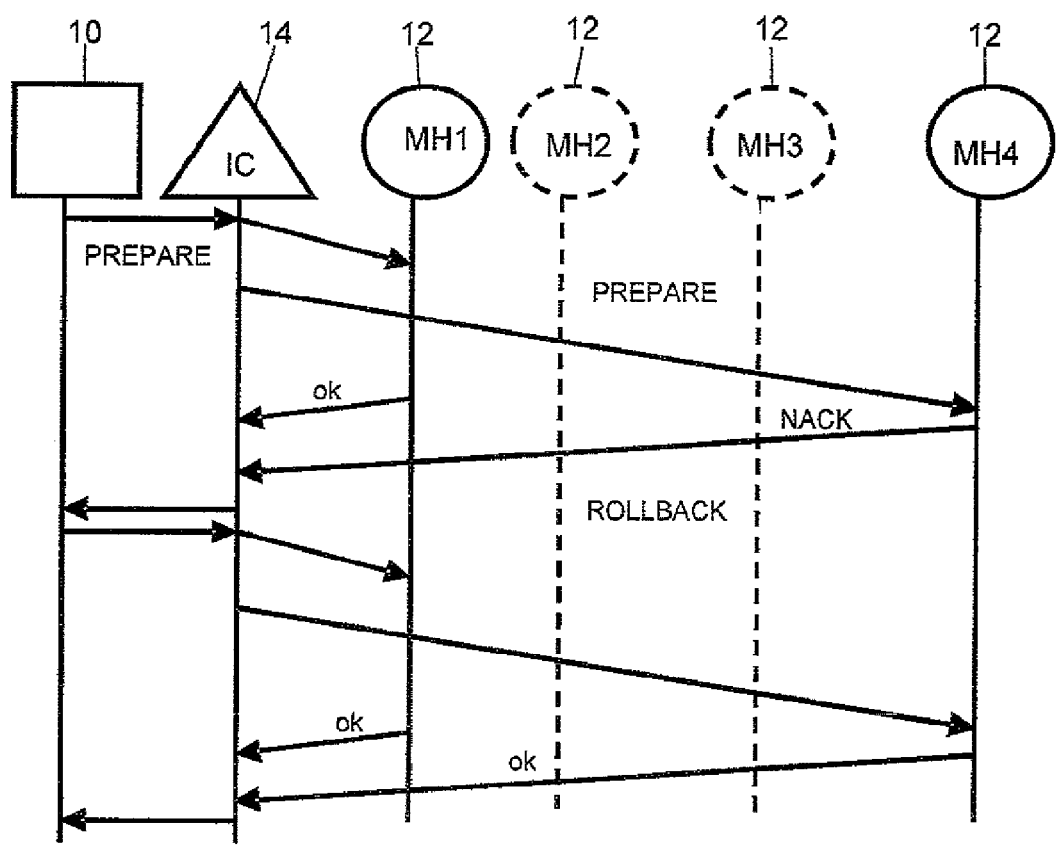
FIG. 2 shows messaging in accordance with the present invention.

FIG. 2 illustrates a similar scenario as FIG. 1 but with the inventive Intelligent Coordinator (IC) 14 shown as a triangle, positioned first in the line of messaging (it does not matter how), enabling the IC 14 to take control of the commit procedure. The IC's presence may be transparent to the original coordinator 10. In the inventive system and method, the IC 14 determines additional context about the mobile hosts 12 who are involved in this transaction or coordination, and leverages that information to otherwise affect the details of the transaction procedure. In FIG. 2, two hosts or participants 12, MH2 and MH3, have been eliminated from the coordination by the IC 14. This component 14 mimics the coordinator 10 from the point of view of the participants 12 but serves to reduce the overall network requirements needed by the coordination. Note that in some protocols, like 2PC, removing participants 12 may have negative effects on the desired result of the transaction, e.g., the state of an MH 12 left out of a transaction may be out of date until its next synchronization.

Figure 3:
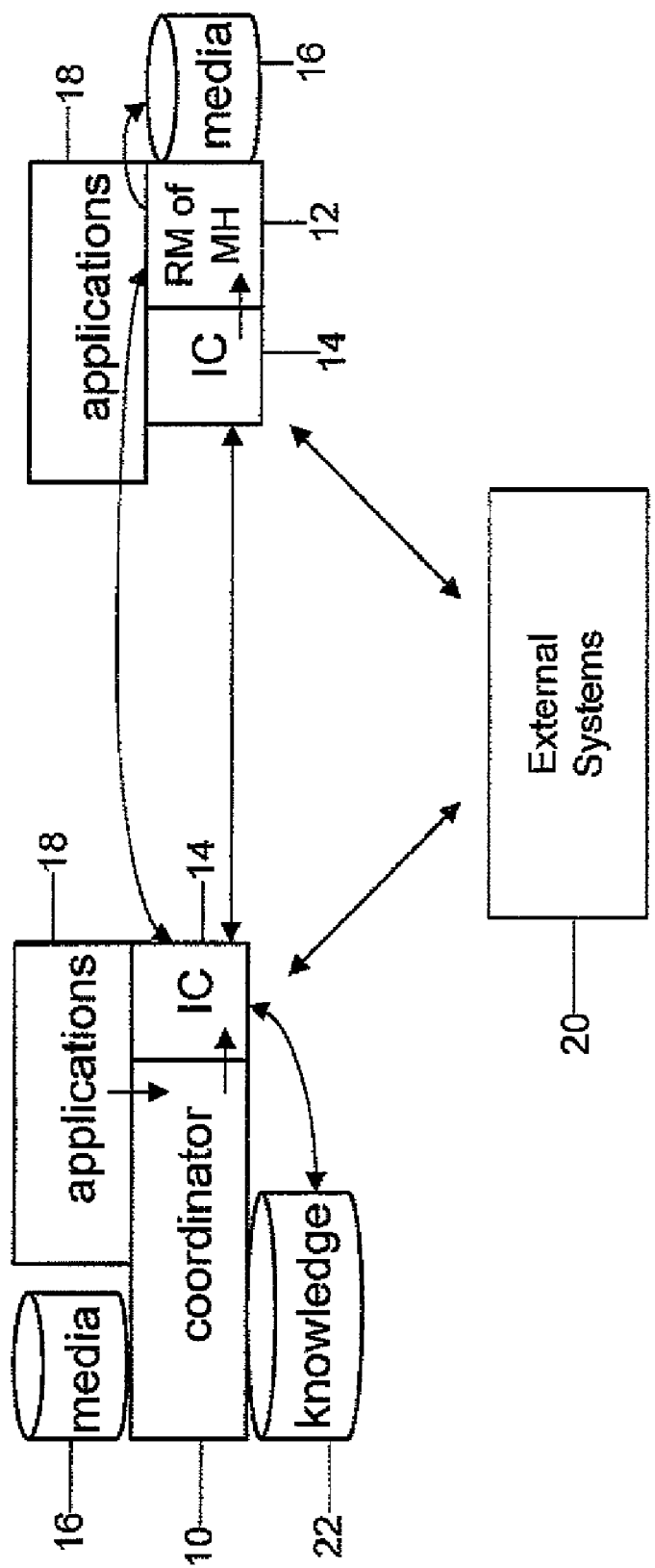
FIG. 3 shows interrelationships among entities according to an embodiment of the present invention.

FIG. 3 shows the interrelationships between components and the IC 14. The sequencing in the diagram is further described in FIG. 4 in accordance with a specific use case. In FIG. 3, the coordinator's 10 functions, and those of the RM of an MH 12 are existing and well-known, as shown in FIG. 1. Similarly, the media stores 16 and various applications 18 are known; services employing illustrative applications 16 are described below.

The IC 14 function, which may be transparent, serves as an interceptor of the coordinator's and/or RM's 12 intents as well as a receptor of messages. An external system 20 is one that provides an IC 14 with additional context regarding the RMs 12, e.g. mobile hosts, in the transaction; additionally or alternatively, the IC 14 may use some context 'knowledge' 22 stored, by itself or by others, within reach locally ("knowledge" icon). The IC 14 may use such context 22 to manipulate the process of coordination to meet some goal. For example, if the goal is to be network efficient, then omitting some of the non-essential MHs 12 from the remaining messaging aspects of the transaction would be a possible decision of the IC 14. The external system 20 is not a part of the invention but could be an application program interface (API) through which the IC 14 could interact, possibly over a network such as the Internet.

A major byproduct of the MH's and their media is the opportunity to create and offer services to other mobile or static hosts (static hosts may also host services). Services may involve just a pair of devices or entities, e.g., two MH's, or one MH and one static host, or may involve a large number of entities. This is not unreasonable as many current services and applications offer a large number of users the ability to connect and interact (though often via a single centralized server, and interaction is usually limited to text or voice chat); such large-number services include: multiplayer games (World of Warcraft, Halo, Sims, etc.), peer-to-peer applications, and social networking and meetup services.

There are a variety of innovative services that involve many MH's and other entities engaging in both structured and ad hoc coordinations and communications. These services are characterized as being flexible and they share the property that many entities can take part in a given communication or coordination; it is not always constrained to a binary, e.g., client-server, situation. A key aspect is that in these services, some or all of the state is being maintained on, and stewarded by, only the MH (not on a main server). Thus, all of such services would benefit from and use resources more efficiently with the inventive system and method.

Some examples of innovative services are now described. A first such service is Virtual Concierge. In this service, a large number of MH's register as service-providers, e.g. contractors, restaurants, tour-guides. Each service-provider also registers its constraints. MH's can then perform on-demand searching for service providers. Services may be rendered from reading and writing information to and from MH's of both providers and consumers.

A second service is P2P photo-sharing and editing. In this service, MH's offer remote users the ability to read and edit selected photos stored in their platform. Clients "check-out" photos, edit them locally, and reinsert them into the owners' folders.

A third service is Mobile Blogging. In mobile blogging, the blog-server is on the MH itself; remote readers leave comments on the blog page.

A fourth service is Mobile device-centric multiplayer games. In device-centric games, the MH stewards the game data, that is, operates as the game server or shares a part of the responsibility of saving the game state. MH's interact and share state change events in P2P fashion. When state changes are missed between MH's, each MH diverges from the global state and is essentially in its own world; at a later time the game might pause and attempt global resynchronization.

As mentioned above, the innovative services provide flexibility, including flexible event delivery and flexible data and/or transaction consistency. Flexible event delivery means that it is not always necessary to ensure reliable and consistent delivery of information. That is, while reliable and consistent delivery may be desirable from the point of view of the applicant, it does not crash or become so inconsistent that it is unusable if messages are missed. Batch or aggregated messages may be sent at a later time to make up for some of the missed ones. Flexible data and/or transaction consistency is allowable in the applications of these services, including weak consistency, intermittent consistency, or sometimes no consistency. That is, while it may be desirable to have consistency, its absence does not cause catastrophic errors or failures. A later or subsequent global update can bring most parties to or "close" to a consistent state.

Six use cases of the inventive IC 14 are now presented, relating to innovative services similar to those described above.

Use-Case: Removing a Participant (General, Photo Sharing Application)

A first use case is a photo-edit scenario in which MHs 12 can request to download, edit, and upload photos from a set of other MH's media stores 16. The user may then use an application 18 to edit together or combine the photos, and may want to upload the modified photo back to all the original MHs 12.

Accordingly, imagine a service in which one uses his or her MH 12 to share photos with friends and the photos stay synchronized on all of the devices 12. One participant decides to edit, e.g. crop, color, etc., a photo residing on his or her MH 12. When this participant activates the application's "save/sync" process, the application must use the coordinator 10 to try to tell the coordinators or RMs 12 on all the friends' devices about the changes, and to commit those photo-changes on each device in a systematic way.

Figure 4:
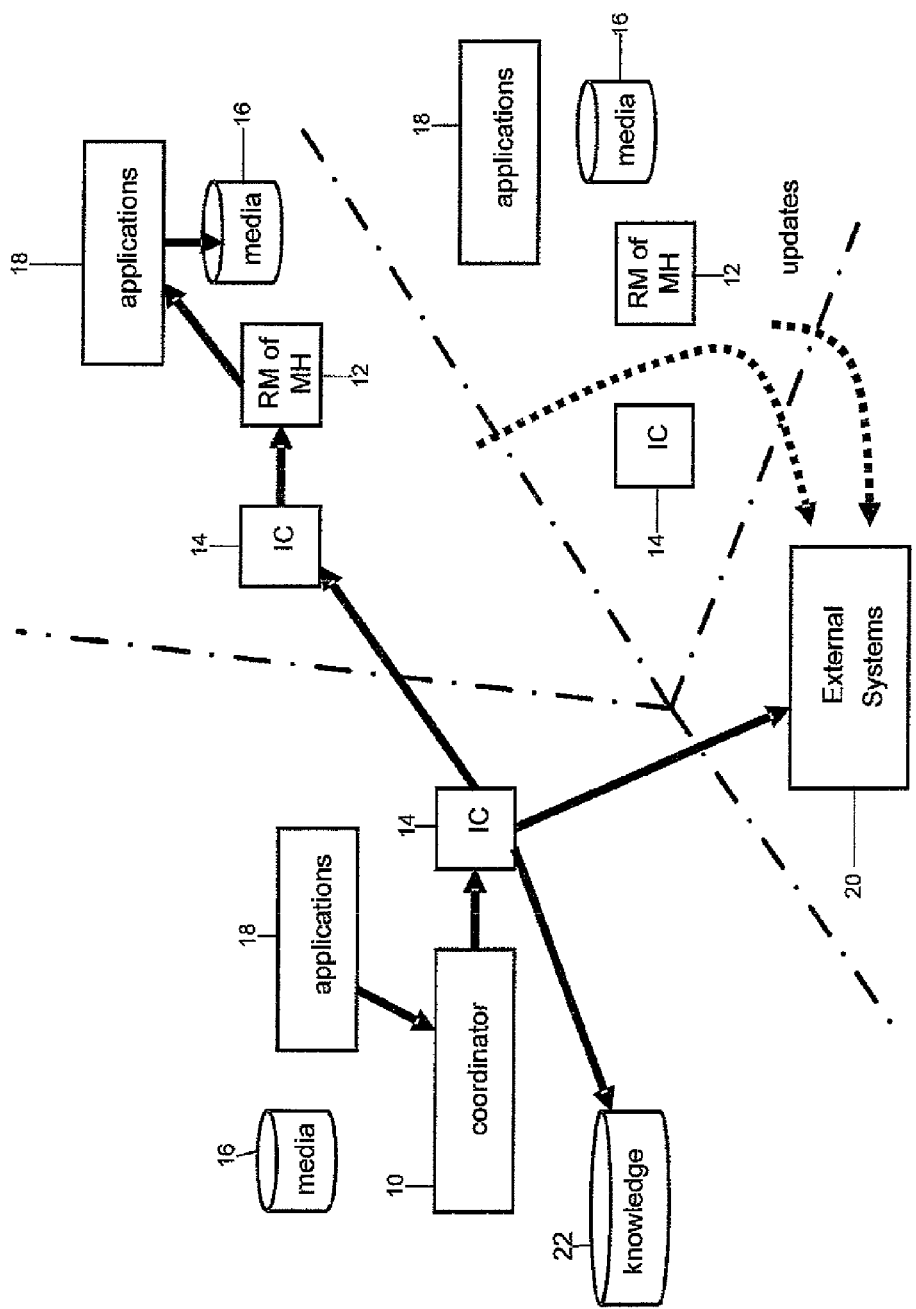
FIG. 4 shows more detailed interrelationships among entities according to an embodiment of the present invention.
Figure 5:
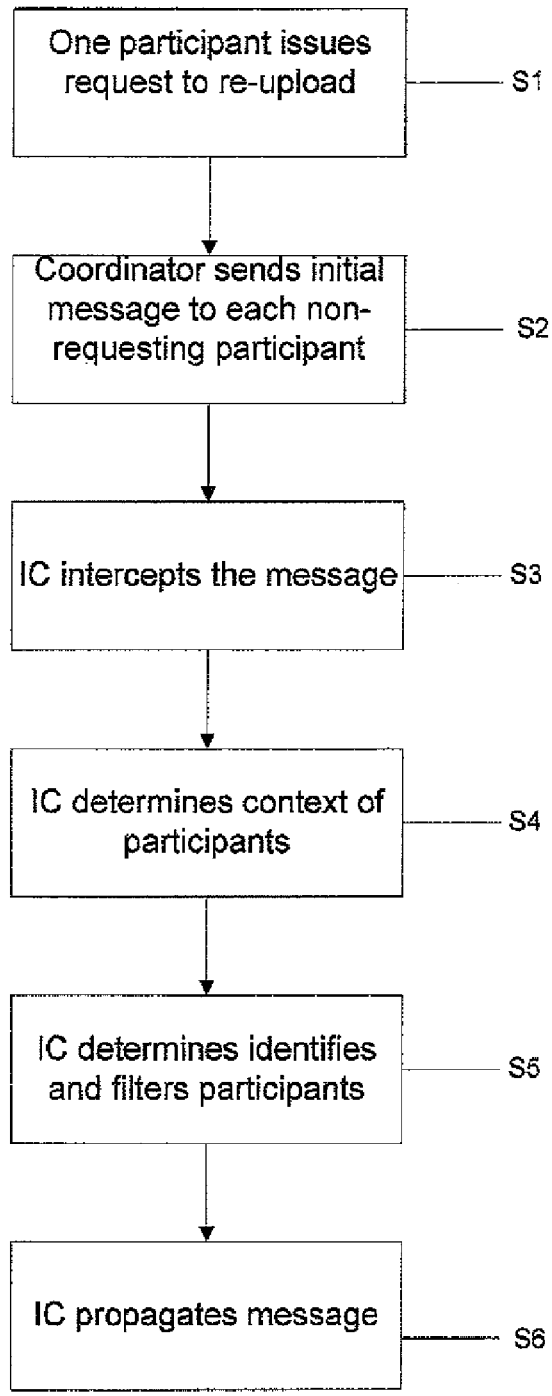
FIG. 5 is a flow diagram of an embodiment of the present invention.

FIG. 4 illustrates this scenario and FIG. 5 is a flow diagram corresponding to FIGS. 3 and 4. In FIG. 4, the "dotted" (_._) straight lines divide physically distributed components, and the "dashed" (- - -) curved lines indicate distribution of physical platforms.

Operation of this use-case, in accordance with the flow diagram of FIG. 5, is as follows. In step S1, an application 18, in response to a "save/sync" process described above, issues a request to re-upload the final edited photo to all the participants 12. The coordinator 10 of this communication, wishing to send multiple messages, one to each of many participants (two (2) are shown in FIG. 4), sends an initial message in step S2. The IC 14 intercepts the message in step S3. In step S4, the IC 14 accesses knowledge, such as a knowledge base, and external systems 20, to determine the current and past context of the remote participants 12 that the coordinator 10 has identified. An algorithm available to the IC 14 then determines in step S5 that one of the participants 12 no longer needs the edited photo, and filters this participant 12 out completely. From the IC 14 point of view, nothing has changed. In step S6, the IC 14 propagates some upload or commit message to each local RM 12 and to the application 18 and its media store 16.

Use-Case: Location-Sensitive Coordinations

In this use-case, the IC 14 uses external and internal context to determine that a particular coordination should be altered due to the location of one or more of the participants and their MH's 12. For example, the IC 14 may reason that since an MH 12 belonging to one of the participants is no longer in the region, e.g. cell, city, ZIP, in which the MH 12 was when a transaction was initiated or a coordination was triggered, then the MH 12 should no longer be considered in the remainder of the coordination.

For example, an application on a participant's MH 12 communicates with other friends "physically nearby" and all the friends together form a "ring of information" that is dynamically synchronized to reflect changes, e.g. new status, new data changes to shared files, etc. As one MH 12 is kicking off a transaction to "commit" some changes the MH 12 considers, its IC 14 in turn uses some resource to understand that several of the friends have now left a given region, e.g. Greenwich Village area. Given this information, the IC 14 decides that the recent changes need not be committed on those friends' MHs 12, e.g. they're no longer "playing the game", so that the IC 14 manipulates the transaction accordingly by, for example, not sending the changes to the out-of-region MHs 12.

Use-Case: Time-Sensitive Coordinations

In this use-case, the IC 14 uses external systems 20 and internal context 22 to determine that a particular coordination should be altered due to a temporal issue. For example, it may be that the IC 14 reasons that since a particular piece of information is time-sensitive (e.g. flight status) and this particular information has not updated or changed since the last version, the IC 14 does not need to involve one or more of the participants 12 in the coordination at all.

Accordingly, the IC 14 uses an internal or external source to verify the "state" of a piece of information that is being "committed" amongst several mobile friends via their MHs 12. Finding that the information has not changed since previous commits, the IC 14 does not involve certain participants 12, thereby saving resources.

Use-Case: Network-Aware Coordinations

In this use-case, the IC 14 uses external systems 20 to read and gather network traffic information, which could be obtained, for example from models or from monitoring systems. With traffic information as well as associations of participants to regions and network equipment, the IC 14 can effectively make the coordination sensitive to network traffic. For example, IC 14 may eliminate messages destined for participant A because A is in a cellular sector already loaded with traffic. IC 14 may reduce the size of messages to others, and/or perform filtering, for similar reasons. IC 14 may also add value-adding information not directly related to the coordination, e.g. piggybacking, to other participants 12 who are in lightly loaded broadband areas with hi-speed connectivity.

This use case is highly desirable from the network operators' point of view where attempting communications with highly mobile devices affects network utilization. Most data-systems, e.g. databases or other media services 16, are not concerned with which network they are on, so that taking network state into account within these transactions is very unusual.

Use-Case: Coordination Augmentation

In this use-case, the IC 14 may augment the coordination flow by adding participants 12 that the coordinator 10 is not necessarily aware of. For example, when A is committing an updated photo to a set of participants 12, IC 14 may deem that some other participant M would be a beneficiary of such a photo and include it in the coordination.

Use-Case: Complex Factor-Sensitive Coordinations

In these use-cases, the IC 14 employs a variety of sensitivity factors and makes a decision based on some non-obvious combination of them. For example, if the IC 14 takes only time or only location into account, meaningful eliminations of messages may not result. However, by considering both time and location, the number of messages may be significantly reduced. In other words, the IC's reasoning for manipulating a transaction is not limited to the above use cases. A combination of such reasoning, or something else altogether, may be implemented by the IC 14.

The Physical Scenario

Figure 6:
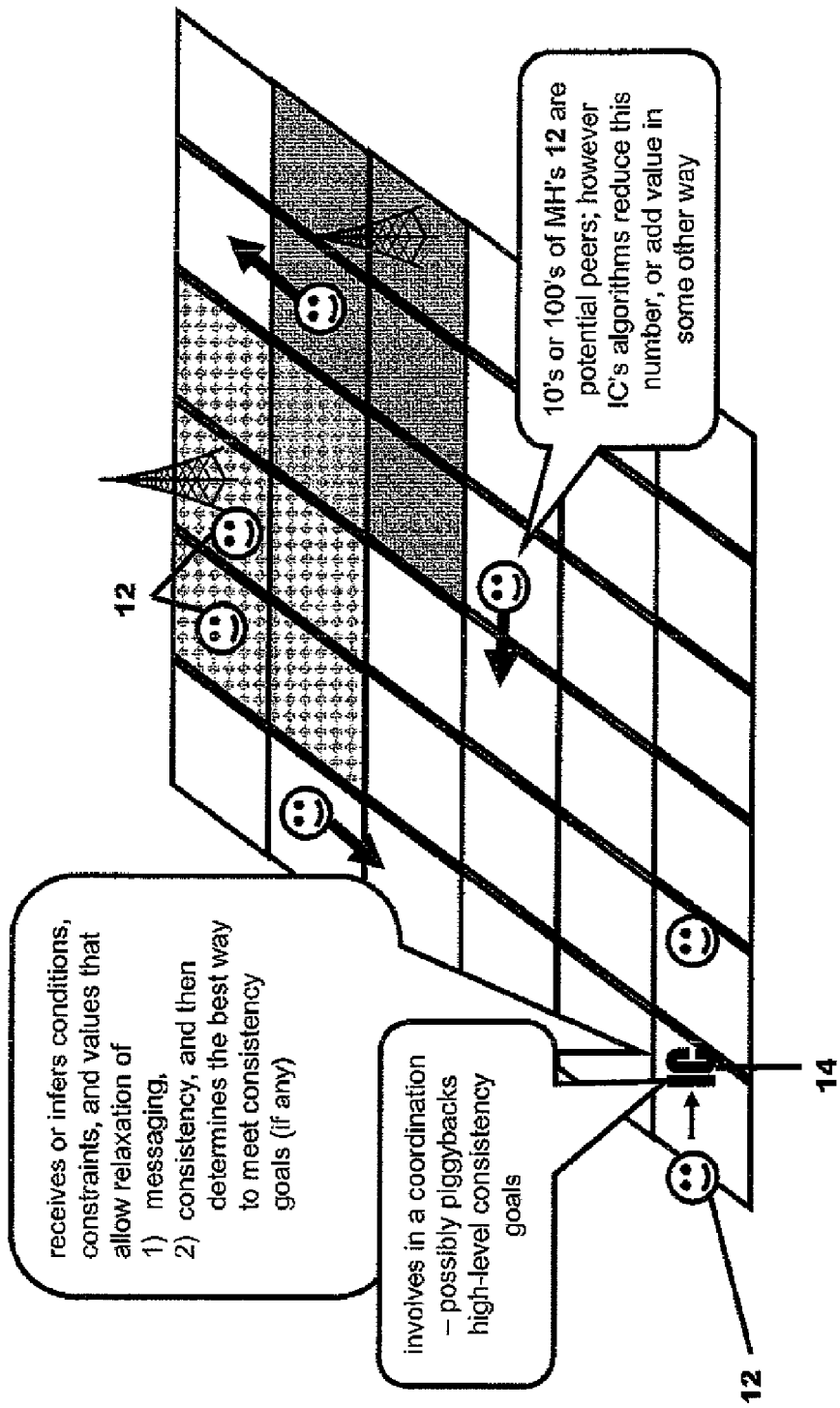
FIG. 6 shows a physical distribution of the components of an embodiment of the inventive system.

FIG. 6 shows some of the artifacts of the inventive system, illustrating a physical distribution of the components. MH's 12 may be stewarding service data and offering services. Tens or hundreds of MH's 12 are potential peers that interact with the data and the services to perform activities, such as read, write, update. FIG. 6 illustrates that physical space may have a bearing on how IC 14 decides to affect the coordination, e.g. those remote participants 12 in certain regions or attached to certain switching centers may no longer be viable candidates for the coordination, even though they might have been only moments earlier. The IC 14 adds value to the messaging and services by using algorithms and heuristics to help meet high level consistency and messaging goals while benefiting the network operating party. The IC 14 receives or infers conditions, constraints, and values, such as MH 12 location, time-constraints, and associated network traffic at a current location, and uses this information to relax messaging and/or consistency, and further to determine the best way, if any, to meet consistency goals. In a coordination, this can involve piggybacking with high-level consistency goals.

The algorithms employed by the IC 14 can incorporate well-known techniques, such as those for sorting lists of items. Sorting lists of items (single key) has known complexity. The well-known Bubble, Insertion, Selection, and Shell sorts are easy to implement and run in complexity $O(n^2)$. Heap, Merge, and QuickSort are harder to implement and debug but run in $O(n\log n)$ complexity. This bodes well even with hundreds of peers in a coordination. Using sorted order can create a desired effect. For example, the well-known Painters algorithm (and reverse Painters) is a rendering technique in which objects needing to be rendered are ordered based on their distance. Then, the rendering occurs from most distant to closest (as a real painter might do). Z-buffering uses a similar approach.

The IC 14, in addition to intercepting the "commit" request from an application 18, is also able to parse meta-expressions that capture meta-details about a transaction. Thus, the application 18 can, in cooperation with an IC 14, indicate what levels of consistency, and/or other information, the application 18 desires, and the IC 14 manipulates the transaction to try to meet the application's request.

Accordingly, the IC 14 receives and understands meta-expressions from a participant 12 wishing to disseminate information to peers 12 in a coordination. The originating peer may piggyback high level goals for the coordination relating to how "consistent" the coordination should be, or to what extent messaging is necessary to every participant. The originator may name individual participants in these directives or simply express general goals and leave it to the IC 14 to resolve. The IC 14 parses these goals and does its best to satisfy them. Regardless, if the detailed meta-expressions are not provided by the originator, the IC may infer these as part of its computing.

Note that because 100% consistency and 100% messaging are typically what is expected of systems, any compromises the IC 14 makes to reduce resources utilization, without degrading quality of experience of the services, is beneficial. In particular, from an MH operator's point of view, underlying geospatial and network conditions are seen as two key aspects that have profound implications on transaction participants.

Figure 7:
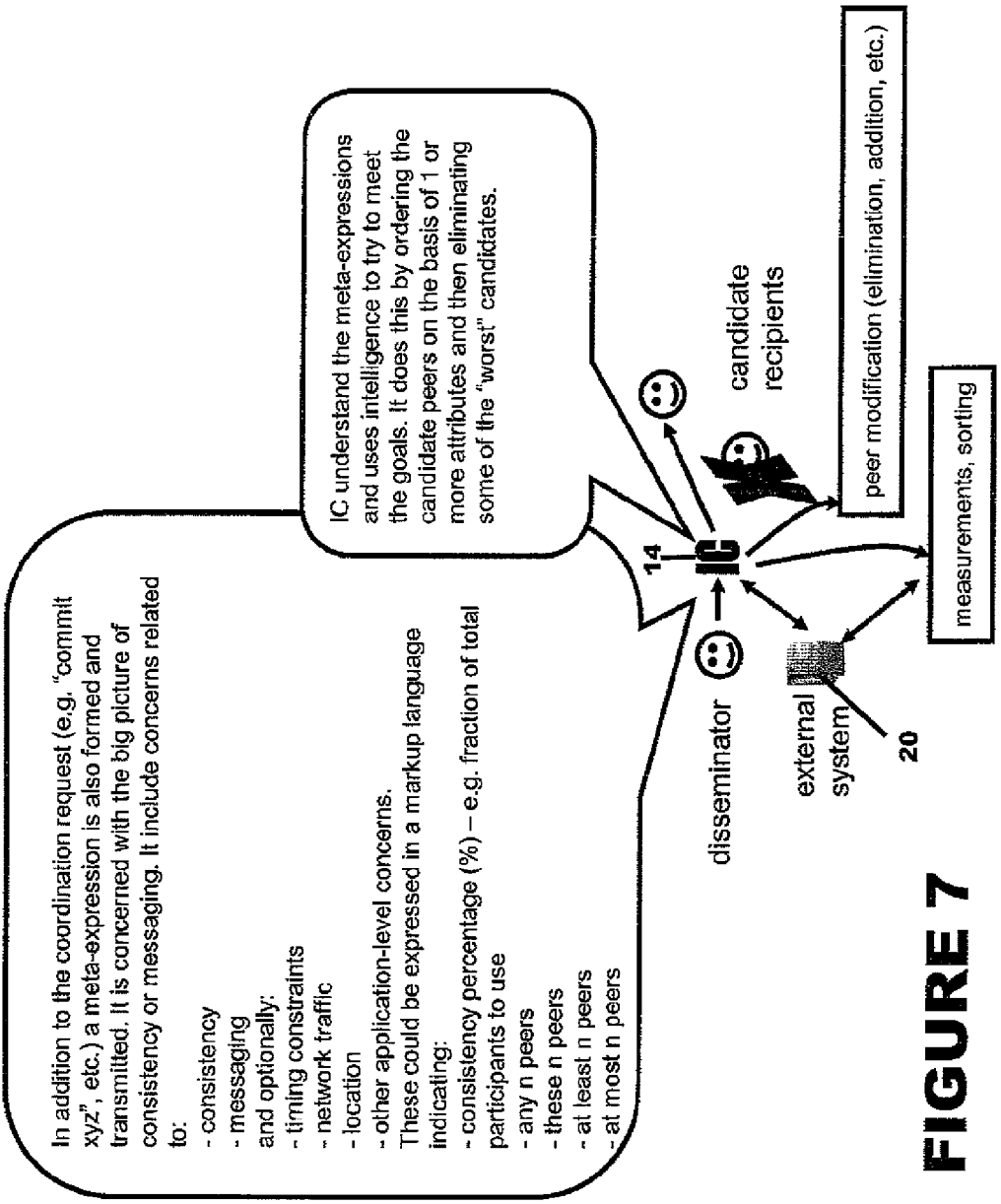
FIG. 7 shows the IC and its roles.

FIG. 7 shows the IC 14 and its roles. As shown, in addition to a coordination request, e.g. "commit xyz", a meta-expression can also be formed and transmitted. As discussed above, the meta-expressions generated by the originating disseminator or application 18 may or may not include detailed meta-expressions. In some situations, the meta-expressions may only be very broad and the IC 14 may infer detailed ones. Concerns related to consistency and messaging, and, optionally, to timing constraints, network traffic, location, geospatial, and/or other application-level issues could be expressed in a mark-up language indicating consistency percentage, e.g. fraction of total participants to use, any n peers, these n peers, at least n peers, at most n peers.

Two key functional operations of the IC 14 are also shown in FIG. 7. One is "peer modification", e.g. changing the transaction to meet goals or other constraints. The other is "measurements, sorting", described below, by which the IC 14 comes to understand the context of the recipients, and how it will decide to eliminate certain recipients.

Meta-expressions will be specified in a canonical form. One embodiment uses XML as syntax and an XML Schema as semantics; another uses an ontology based on description logics (e.g., built using the Web Ontology Language) for semantics. In this way, the meta-expressions are both well-understood by both the sender and recipient, and able to convey complex semantics. Some types of meta-expression information, exploited by IC 14, can be composite, network level, temporal, location, messaging and consistency information.

FIG. 8 shows one ranking approach that can be used in one embodiment of the inventive system, that is the "measurements, sorting" function shown in FIG. 7. This is one approach to sorting, ranking, eliminating peers in a coordination with respect to a) their distance (location), b) the temporal value, c) the network traffic at their location. However, other metrics are possible. This is an embodiment of an algorithm for sorting candidates based on various aspects of the context and provides IC 14 a basis for recipient elimination and/or transaction manipulation.

Essentially, in this algorithm, the IC 14 knows the state of each recipient in terms of the distance from the IC 14 to the recipient, the background network traffic at the switching center where the recipient is, and the size of the "time-window" of opportunity, e.g. "5 min window" means that after 5 minutes from now, the recipient is almost surely a candidate for elimination. The time window may also be specified as an absolute time, e.g. 9:00 AM. How these metrics are arrived at is somewhat irrelevant, for example, IC 14 may use a combination of external Operational Support systems and other systems that help it make these rankings.

The bottom of FIG. 8 shows three possible rankings of the peers 12. To choose the recipients to eliminate the IC 14 may create a sorted list, for example of best to worst candidates, for each attribute listed above. It will then look at the candidates below some threshold level and use those as a basis for elimination as they are the most likely to be irrelevant to the transaction.

The IC 14 may set the "thresholds" for elimination by considering the meta-expressions provided by the application 18 regarding the urgency or consistency levels desired for this transaction.

The following is an algorithm, in pseudo-code, that could be employed to use a sliding-bar mechanism to find the least desirable candidates across several context attributes.

1. Receive the high-level command from a coordinator
2. Parse the meta-expression, extracting the goal G and the participants $P_1 \ldots P_n$
3. Use internal or external knowledge to sort $P_1 \ldots P_n$ on the basis of:
    a. network traffic at $P_i$'s location
    b. $P_i$'s distance from the coordinator
    c. $P_i$'s time window of opportunity
    d. any other arbitrary context that can be quantified, such as: weather at the participant, hardware versions, etc.
    Results in 3 sorted lists: L1, L2, L3 where the "least desirable" participants can be determined by examining the list from one end.
4. Optional: the system can now use any explicit Rules that may eliminate certain participants. For example, a rule may be, "eliminate all participants within 50 m of the Empire State Building, regardless of their other attributes or ranking."
5. Depending on the goal, determine how many of the participants should be eliminated—say m participants. Create a threshold bar in each list that divides those m participants from the rest.
6. Three cases are possible:
    a. each List contains the same "least desirable" elements. In this case eliminate those and the reduction is finished
    b. the Lists share 1 or more elements, between 2 or more lists. In this case eliminate those and resort each list.
    c. the Lists share no elements. In this case the thresholds can be relaxed (the bar in the Figure slides downwards) or another metric can be used to decide the "least desirable" participants across all metrics.

Re-sort lists and repeat if necessary.

This inventive system can be implemented as computer software or a computer readable program for operating on a computer. The computer program can be stored on computer readable medium.

While the present invention has been described in particular embodiments, it should be appreciated that the present invention should not be construed as limited by such embodiments, but rather construed according to the claims below.

What is claimed is:

1. A system for intelligent, context-sensitive enhancement of transactions among a plurality of mobile hosts engaging in services, each of the mobile hosts having a local coordinator, comprising:
    an actual coordinator; and
    an intelligence coordinator configured to determine context regarding one or more of the plurality of mobile hosts and leverage the context to enhance the transactions between one or more of the local coordinators and the actual coordinator, the context being at least a network load near a network location of the mobile host, wherein the intelligence coordinator receives and parses a meta-expression piggy-backed on a transaction message, uses the parsed meta-expression to form thresholds, and based on the thresholds, the intelligence coordinator eliminates one or more mobile hosts engaging in the services to reduce a number of transactions.

2. The system according to claim 1, wherein the context is leveraged by at least one of reducing a number of transactions, and by reducing an amount of data in the transactions.

3. The system according to claim 1, wherein the context comprises at least one of a physical location, and temporal data of the mobile host.

4. The system according to claim 1, further comprising an application operating on the service, wherein the intelligence coordinator improves performance of the application.

5. A system for intelligent, context-sensitive enhancement of transactions among a plurality of mobile hosts engaging in services, each of the mobile hosts having a local coordinator, comprising:
    an actual coordinator; and
    an intelligence coordinator configured to determine context regarding one or more of the plurality of mobile hosts and leverage the context to enhance the transactions between one or more of the local coordinators and the actual coordinator, the context being at least a network load near a network location of the mobile host,
    wherein, to leverage the context, the intelligence coordinator perfouiis at least one of intercepting and reading a protocol of the local coordinator, mimicking the actual coordinator from a point of view of the mobile hosts engaging in the services, manipulating and passing information back to the actual coordinator, interworking with internal knowledge bases and with external systems, and adding, removing, and modifying the number of mobile hosts engaging in the services.

6. A method for intelligent, context-sensitive enhancement of transactions among a plurality of mobile hosts engaging in services, each of the mobile hosts having a local coordinator, said method comprising steps of:
    determining context regarding one or more of the plurality of mobile hosts, the context being at least a network load near a network location of the one or more of the plurality of mobile hosts; and
    leveraging the context to enhance the transactions between one or more of the local coordinators and an actual coordinator, the step of leveraging comprising:
    receiving and parsing a meta-expression piggy-backed on a transaction message;
    using the parsed meta-expression to form thresholds; and
    based on the thresholds, eliminating one or more mobile hosts engaging in the services to reduce a number of transactions.

7. The method according to claim 6, wherein the step of leveraging is performed by at least one of reducing a number of transactions, and by reducing an amount of data in the transactions.

8. The method according to claim 6, wherein the context comprises at least one of a physical location, and temporal data of the mobile host.

9. The method according to claim 6, wherein the step of leveraging improves performance of an application operating on the services.

10. A method for intelligent, context-sensitive enhancement of transactions among a plurality of mobile hosts engaging in services, each of the mobile hosts having a local coordinator said method comprising steps of:
    determining context regarding one or more of the plurality of mobile hosts, the context being at least a network load near a network location of the one or more of the plurality of mobile hosts; and
    leveraging the context to enhance the transactions between one or more of the local coordinators and an actual coordinator, wherein leveraging is performed by at least one of:
    intercepting and reading a protocol of a local coordinator;
    mimicking an actual coordinator from a point of view of the mobile hosts engaging in the services;
    manipulating and passing information back to the actual coordinator;
    interworking with internal knowledge bases and with external systems; and
    adding, removing, and modifying the number of mobile hosts engaging in the services.

11. A non-transitory computer readable medium having computer readable program code for operating on a computer for intelligent, context-sensitive enhancement of transactions among a plurality of mobile hosts engaging in services, each of the mobile hosts having a local coordinator, the program comprising steps of:
    determining context regarding one or more of the plurality of mobile hosts, the context being at least a network load near a network location of the one or more of the plurality of mobile hosts; and
    leveraging the context to enhance the transactions between one or more of the local coordinators and an actual coordinator, the step of leveraging comprising:
    receiving and parsing a meta-expression piggy-backed on a transaction message;
    using the parsed meta-expression to form thresholds; and
    based on the thresholds, eliminating one or more mobile hosts engaging in the services to reduce a number of transactions.

12. The non-transitory computer readable medium according to claim 11, wherein the step of leveraging is performed by at least one of reducing a number of transactions, and by reducing an amount of data in the transactions.

13. The non-transitory computer readable medium according to claim 11, wherein the context comprises at least one of a physical location, and temporal data of the mobile host.

14. The non-transitory computer readable medium according to claim 11, wherein the step of leveraging improves performance of an application operating on the services.

15. A non-transitory computer readable medium having computer readable program code for operating on a computer for intelligent, context-sensitive enhancement of transactions among a plurality of mobile hosts engaging in services, each of the mobile hosts having a local coordinator, the program comprising steps of:
    determining context regarding one or more of the plurality of mobile hosts, the context being at least a network load near a network location of the one or more of the plurality of mobile hosts; and
    leveraging the context to enhance the transactions between one or more of the local coordinators and an actual coordinator, wherein leveraging is performed by at least one of:
    intercepting and reading a protocol of a local coordinator;
    mimicking an actual coordinator from a point of view of the mobile hosts engaging in the services;
    manipulating and passing information back to the actual coordinator;
    interworking with internal knowledge bases and with external systems; and
    adding, removing, and modifying the number of mobile hosts engaging in the services.

\* \* \* \* \*

UNITED STATES PATENT AND TRADEMARK OFFICE
CERTIFICATE OF CORRECTION

| | |
|---|---|
| PATENT NO. | : 8,255,505 B2 |
| APPLICATION NO. | : 12/182621 |
| DATED | : August 28, 2012 |
| INVENTOR(S) | : Falchuk et al. |

It is certified that error appears in the above-identified patent and that said Letters Patent is hereby corrected as shown below:

In the Specification

In Column 2, Line 3, delete "Tranceiver" and insert -- Transceiver --, therefor.

In Column 2, Line 37, delete "syncrhonous" and insert -- synchronous --, therefor.

In Column 10, Line 8, delete "finished" and insert -- finished. --, therefor.

In the Claims

In Column 10, Line 63, delete "perfouiis" and insert -- performs --, therefor.

In Column 11, Lines 34-35, delete "coordinator" and insert -- coordinator, --, therefor.

Signed and Sealed this
Fourth Day of November, 2014

Michelle K. Lee
*Deputy Director of the United States Patent and Trademark Office*